United States Patent [19]
Schwarz

[11] 3,726,624
[45] Apr. 10, 1973

[54] FOAM SHEET MATERIAL MEANS

[76] Inventor: Irving L. Schwarz, 360 Merrimac St., Newton, Mass. 01843

[22] Filed: Feb. 27, 1970

[21] Appl. No.: 14,954

[52] U.S. Cl. .................. 425/145, 425/4 C, 161/162, 161/168, 161/403, 264/109
[51] Int. Cl. ........................ B29d 27/00, B32b 5/16
[58] Field of Search ...................... 156/62.2, 77–79, 156/242, 246, 324, 331, 360, 369, 370, 372, 376, 378, 500, 538, 365; 264/109, 112, 113; 198/39, 40, 232; 24/13; 222/59, 64; 18/2 MM, 2 MS, 15 F, 15 V, 15 R, 15 S

[56] References Cited

UNITED STATES PATENTS

| | | | |
|---|---|---|---|
| 1,460,573 | 7/1923 | Church et al. | 198/39 X |
| 1,601,811 | 10/1926 | Church | 198/39 X |
| 2,880,852 | 4/1959 | Bergmann | 198/232 |
| 2,892,216 | 6/1959 | Steel | 260/2.3 |
| 3,039,137 | 6/1952 | Smith et al. | 156/369 X |

*Primary Examiner*—William J. Van Balen
*Attorney*—Wolf, Greenfield & Sacks

[57] ABSTRACT

A urethane binder is used in a continuous process which employs metering and leveling devices to continuously form uniform density sheet materials from scrap foam particles. Novel uniform density, flame retardant, plastic foam sheets containing urethane binder are formed. A single application step is used simultaneously with formation of the foam sheet materials to incorporate at least one surfacing sheet of solid plastic on the foam sheet materials.

7 Claims, 9 Drawing Figures

PATENTED APR 10 1973 3,726,624

INVENTOR
IRVING L. SCHWARZ
BY
Wolf, Greenfield, Hieken & Sacks
ATTORNEYS 3,726,624

FOAM SHEET MATERIAL MEANS

BACKGROUND OF THE INVENTION

Many methods have been proposed for reclaiming organic foam materials for reuse as foam sheet materials. Polyurethane foam particles are often reclaimed by processing cut foam particles along with resin binders in batch operations. Cylindrical rolls of reclaimed polyurethane foam bound together by the resin binder are cut to shear sheet materials from the rolls as the rolls are rotated. Such procedures suffer the disadvantages common to batch operations including limited lengths of sheet materials formed and high cost. Moreover, uniformity of density in such reclaimed sheets is often difficult to obtain. If it is desired to apply surfacing sheets as of polyethylene to the sheets so formed, a separate operation is used adding to costs. Similarly, a second operation must be used to obtain flame retardant properties in reclaimed foam sheets so formed.

The prior art has suggested a continuous process for forming reclaimed foam sheets of foam rubber. In the suggested prior process exemplified in U.S. Pat. No. 2,892,216, a urethane foam binder is used in a continuous operation to form reclaimed foam rubber sheets. However, the prior art has for the most part utilized the batch process described above when forming reclaimed sheets of polyurethane foam probably because of the difficulties encountered in using a continuous operation which difficulties include controlling both sheet thickness and uniformity of density.

It is an important object of this invention to provide a means and method of continuously forming sheet materials of plastic foam particles bound by a urethane binder.

Another object of this invention is to provide a method in accordance with the preceding object which is economical to carry out.

Still another object of this invention is to provide a method in accordance with the preceding object which can be used in conjunction with a surfacing sheet application to simultaneously form bound foam sheets with attached surfacing sheets.

Still another object of this invention is to provide a method in accordance with the preceding objects which can be carried out at high speeds and maximized efficiency.

Still another object of this invention is to provide an improved flame retardant foam sheet material.

SUMMARY OF THE INVENTION

According to the invention, a sheet material is continuously formed from reclaimed or scrap foam particles. The foam particles are selected from the group consisting of polyurethane foam, polyethylene foam, polypropylene foam and other resilient organic foams. The foam particles are cut to size and uniformly admixed with from 2 to 15 percent by weight of the foam of a urethane resin binder. Preferably some water or other catalyst is included in the mixture. The mixture formed is then metered onto a moving conveyor such as an endless belt. The conveyor is continuously moved while leveling and spreading the mixture thereon and monitoring the height of the mixture on the conveyor. The mixture is then continuously passed into a reaction zone where heat and pressure are applied to form a cured sheet material. Preferably the reaction zone includes a steam application whereby the steam aids in the curing of the binder. A system is provided for carrying out the method of this invention.

In one embodiment of the invention, a flame retardant agent is incorporated in the binder, prior to passage into the reaction zone, in sufficient quantity to coat the foam particles so that a flame retardant sheet material is obtained.

In another embodiment of the invention, a plastic surfacing sheet is applied to the mixture to form the resultant sheet material with an attached surfacing layer in the reaction zone. The incorporated binder adhesively secures the plastic surfacing sheet to the foam sheet material.

Advantages of the present invention include a minimization of costs as compared with the current widely used batch system and a maximization of desired product density uniformity not only in the longitudinal direction of a sheet material but also across the width of the sheet material. The continuous process permits formation of foam sheets of any desired length eliminating wasteful cutting procedures and minimizing trim waste in final use. Flame retardant sheet materials can easily be formed as can sheet material having solid plastic surfacing layers. The method permits application of the plastic surfacing layer without secondary adhesive operations so that the binder for the foam particles also acts to adhesively secure the plastic surfacing layers in the resultant sheet material. The reclaimed sheet materials of this invention are useful as carpet underlays, furniture cushions and the like.

BRIEF DESCRIPTION OF THE DRAWINGS

The above and other objects, features and advantages of the present invention will be better understood from the following specification when read in conjunction with the accompanying drawings in which.

DESCRIPTION OF PREFERRED EMBODIMENTS

Figure 1:
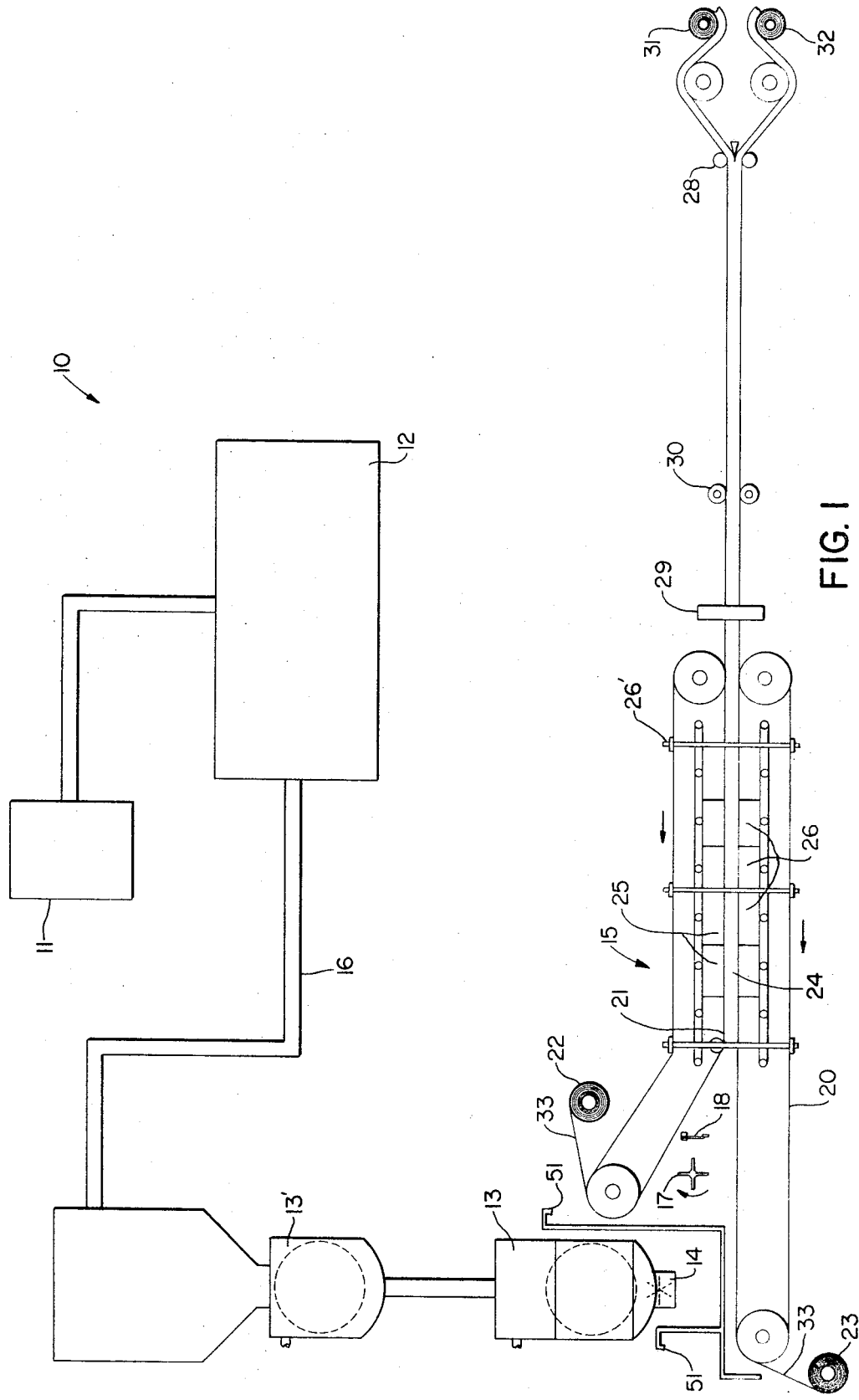
FIG. 1 is a diagrammatic flow sheet illustrating a preferred embodiment of the invention.

With reference now to the drawings, a preferred system for carrying out the continuous method of this invention is illustrated generally at 10. The system comprises first and second grinders 11 and 12 interconnected with first and second mixers 13, 13' vertically arranged above a metering device 14 which is in turn positioned above a conveyor section 15. The mixers and grinders are interconnected by conduit means 16 which may for example be pneumatic piping.

The conveyor section 15 includes a butterfly leveling and spreading device 17, a level indicator 18 and a safety shut-off 19 mounted at the lead end of endless conveyor belts 20 and 21. Surfacing sheet feed rolls 22 and 23 are provided for feeding surfacing sheets as will be described, between the belts 20 and 21. A reaction or curing zone 24 is established between upper and lower belts 20 and 21 which are in turn backed with steam platens or tanks 25 and 26 mounted on vertical members 26' of a machine frame (not shown) for vertical adjustment as is known in the art. A conventional slitting device 28 is provided for severing sheet material produced if desired. Conventional edge trimmers 29, drive rolls 30 and take-up rollers 31 and 32 are preferably aligned with the conveyor belts.

In operation of the system, scrap or reclaimed resilient organic foam such as polyurethane foam is passed into a first grinder 11 which can be any conventional grinder to produce substantially uniform particles such as 1 to 4 inch squares. The broken up particles are then passed to a second grinder 12 which can be any conventional grinder such as a hammermill where the particles are further reduced in size as for example to 5/16 inch squares. The particles are then continuously passed to a mixing zone where resin binder in the form of a urethane prepolymer is sprayed over the particles from a storage tank (not shown) to uniformly mix the binder with the particles as in a series of Kelly duplex mixers 13, 13'. Preferably two mixers are used with half of the binder to be used added to each of the mixers. The use of two mixers provides uniform mixing of the binder and foam and assures avoidance of binder-free areas in the resultant sheet material. Preferably just prior to entrance to the mixer 13, water is sprayed over the particles and uniformly admixed therewith along with the binder in the mixer to enhance the reaction of the binder. The mixture formed is then deposited on the underlying end of belt 20. Endless belts 20 and 21 are continuously moved at a predetermined speed and the reaction zone 24 is heated to a temperature preferably in the range of from 180°F to 360°F.

If surfacing sheets are to be used, rolls 22 and 23 are actuated to feed resilient solid plastic sheet materials 33 through the reaction zone adjacent each of the endless belts. Either or both surfaces of the resultant sheet can have a surfacing sheet applied by the use of a selected feed roll 22 or 23.

The metering device 14 determines the rate of lay down on the belt 20 of the mixed reclaimed foam and binder and is preferably interconnected with the level indicator 18 and the safety shut-off 19 as will be described.

Figure 6:
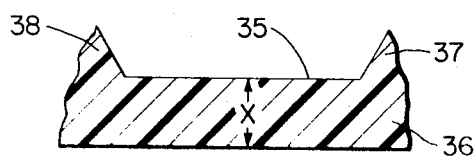
FIG. 6 is a cross sectional view of a foam-binder mixture at one stage of manufacture.

The mixture of foam particles and binder falls directly downward onto the belt 20 and is carried along to the butterfly spreader 18 which is continuously rotated to level and spread the mixture and form a troughed portion on the top surface of the layer of the mixture on the belt. This troughed section is best shown in FIG. 6 at 35 with the mixture 36 forming two side beads or buildups 37 and 38. Thus, the butterfly spreading device acts to spread the mixture more uniformly over the width of the belt 20 and further forms beads or buildups 37 and 38 which aid in creating a more uniform product. Since there is a build-up at the marginal edges, when the mixture is compressed between the belts in the reaction zone, uniform density can be obtained substantially throughout the width of the sheet product formed.

Figures 4, 5:
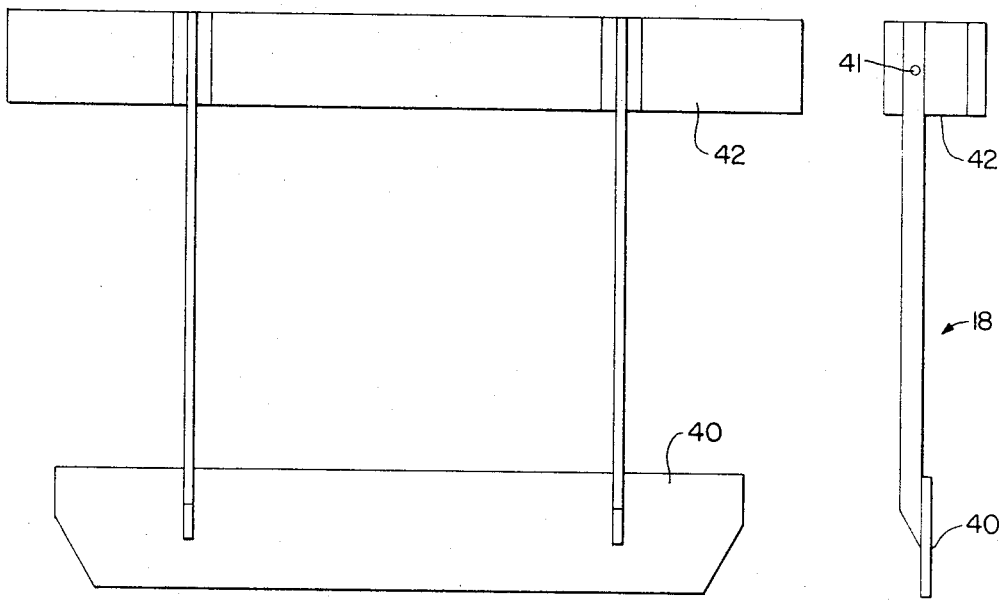
FIGS. 4 and 5 are side and front views respectively of a level indicator thereof.

After the mixture 36 passes through the butterfly spreader 17, a level indicator 18 best illustrated in FIGS. 4 and 5 contacts the flat surface of the troughed-shaped section 35 and indicates the level of the trough corresponding to the thickness X of the mixture. If the mixture buildup goes above a predetermined level, suitable circuitry (not shown) is used to change the rate of mixture lay down by changing the speed of rotation of the metering device 14. Alternatively, the level indicator 18 can be linked to a microswitch which automatically cuts off the entire apparatus until the proper metering settings are set on the metering device 14. As illustrated in FIG. 5, the level indicator comprises a flat paddle device or bar 40 mounted on a pivotal axle 41 and interconnected with a microswitch 42 in a known manner to activate the circuitry required.

Figure 7:
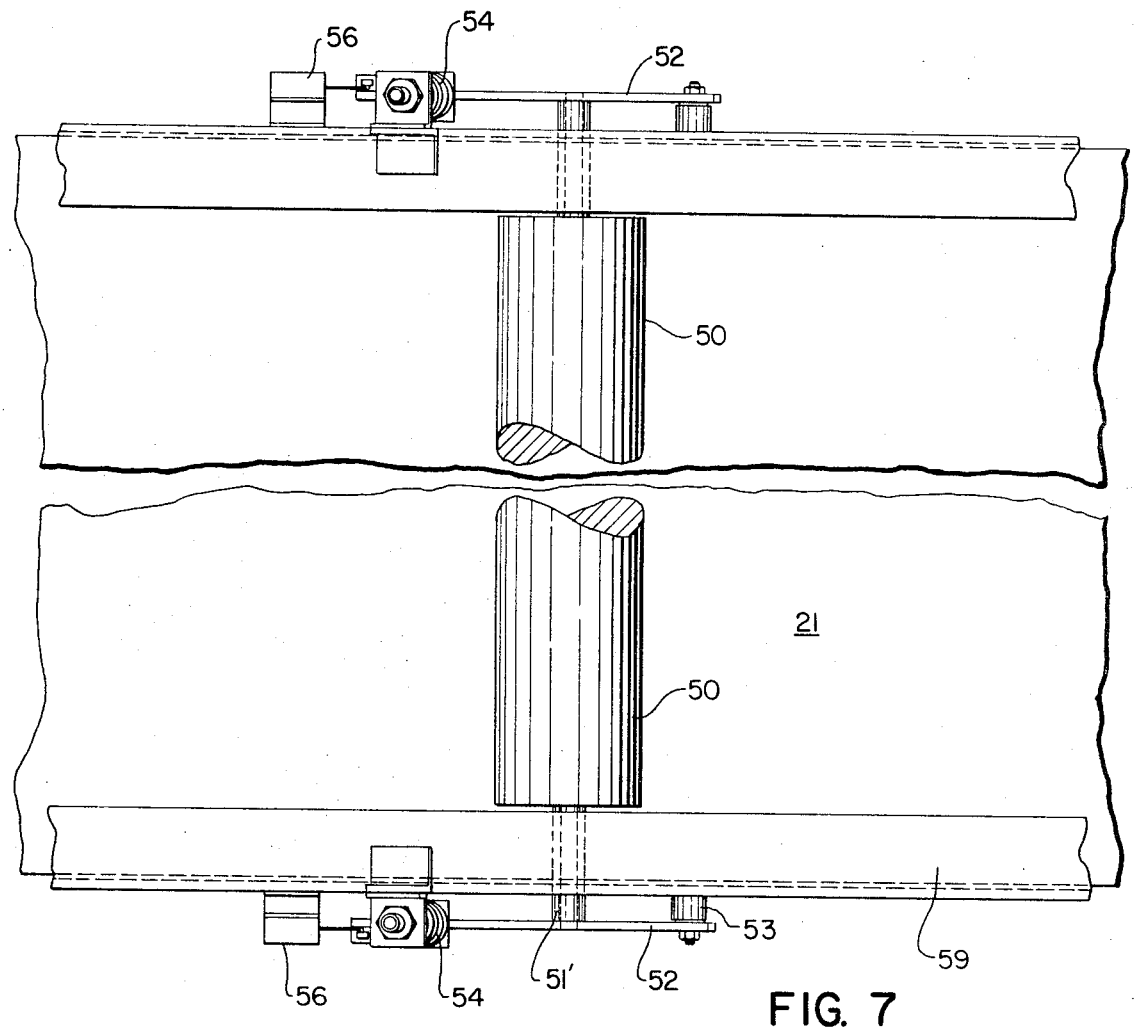
FIGS. 7 and 8 are top and side views respectively of a safety device.
Figure 8:
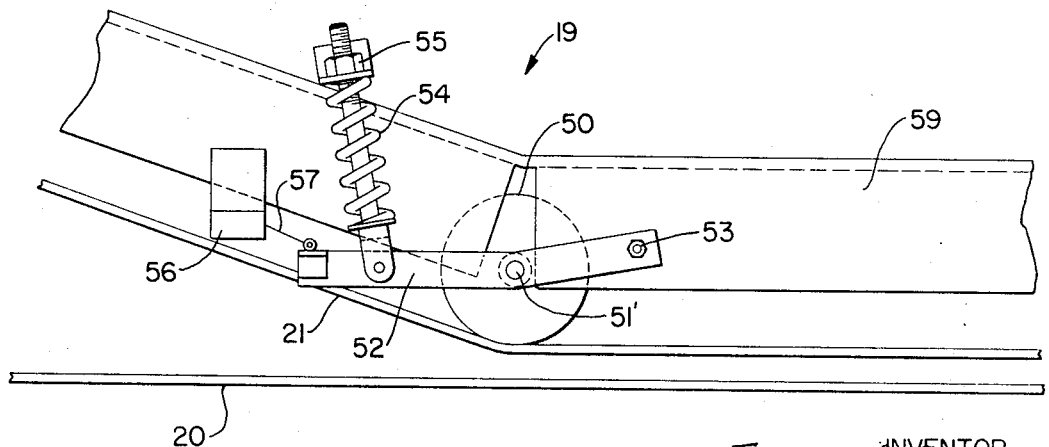

From the level indicator 18, the mixture passes to the compression section of the apparatus in the reaction zone 24 where it is uniformly compacted. The safety shut-off 19 best shown in FIGS. 7 and 8 comprises a roller 50 pivotally mounted on axle 51 which is in turn fixedly mounted on either side of the belt 21 by a set of lever arms 52 which are pivotal about a fixed axle 53. A spring and adjusting nut arrangement 54 and 55 of any conventional nature mounted on an angle iron portion 50 of the machine frame (not shown) predetermines the pressure of the roller on the mixture. A microswitch 56 is interconnected with suitable circuitry to shut off the system when actuated and carries a sensing arm 57 positioned to be actuated by one end of the lever arm 52 when the lever arm 52 is raised. Raising of the lever arm occurs if the back pressure exerted by the mixture exceeds a predetermined amount determined by the spring pressure 54. Thus, if foreign objects such as metal scraps, wood and the like enter the reaction zone, the machine is automatically shut down and the foreign objects removed by the operator thereby preventing damage to the belts and to the machine.

The steam tanks 25 and 26 are of conventional nature and apply the required curing heat to the mixture in the reaction zone. The steam tanks backing the upper belt 21 are mounted to allow up or down movement to set the thickness of the reaction zone 24 at any desired value as known in the art. Belts 20 and 21 are preferably Teflon coated wire or glass screen belts which permit steam from the members 25 and 26 to enter into the mixture and provide water for the reaction. The moving belts provide sufficient pressure to continuously move the sheet material formed through the system since at the right-hand end of the reaction zone, the sheet material is in its final cured form. Supplementary conventional pulling rolls 30 and edge trimmer 29 can be used if desired. The sheets so formed are suitable for use as cushioning materials, rug underlays and the like. If desired, a sheet formed can be split as at a conventional splitter 28.

The system can be operated with or without the use of the surfacing sheets 30 or with one or the other of such surfacing sheets. The surfacing sheets when used are preferably sprayed with water as by water spray heads 50 and 51 to enhance the binding action of the binder to adhesively secure the reclaimed foam directly to the surfacing sheets. The ability to apply surface sheets is extremely important since it permits formation of bound sheet materials simultaneously with adhesively secured surfacing sheets if desired.

Figure 2:
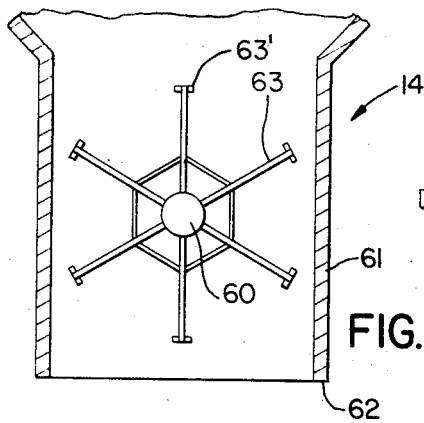
FIG. 2 is a semidiagrammatic side view of a metering device thereof.
Figure 2A:
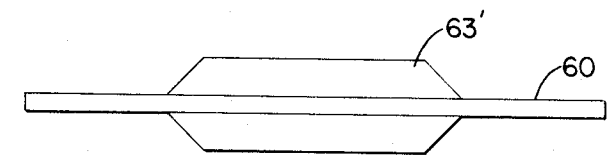
FIG. 2A is a top view of a blade element of the metering device.

The metering device 14 is best shown in FIGS. 1, 2 and 2A and has an elongated shaft 60 mounted for rotation in an open bottom trough 61 having a rectangular bottom opening 62 for passage of the binder resin mixture downwardly onto the belt 20. The shaft 60 carries transversely extending vanes or blades 63. The speed of rotation of shaft 60 determines in part the rate of deposition of the resin-binder mixture on the belt 20. The rate of deposition is further determined by the belt speed. Preferably one or more of the vanes 63 have T-shaped ends 63' positioned intermediate side edges of the vanes. For example, in the preferred embodiment, each vane has a width of 58 inches while each T-shaped portion 63' has a width of 38 inches intermediate the vane ends. The T-shaped portion forms a rectangle of approximately 38 inches by 2 inches and aids in insuring uniform deposition of the binder-foam mixture on the belt 20.

Figure 3:
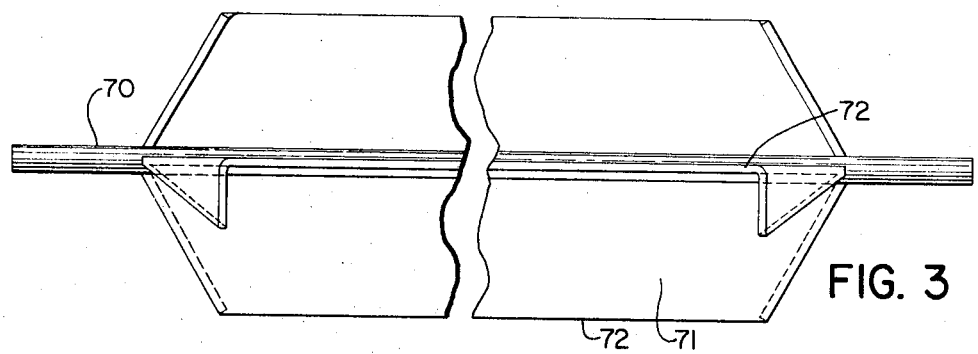
FIG. 3 is a front view of a leveling and spreading device thereof.

The butterfly spreader 17 is best illustrated in FIG. 3. The device comprises a central drive shaft 70 mounted for rotation on bearings (not shown) at either side of the machine and carrying scoop-shaped blades 71. The blades 71 define a lower surfacing edge 72 adapted to form the trough 35 previously described. The leveling device is preferably mounted so that it digs into the mixture deposited on the belt to an extent of from 10 to 30 percent and preferably 20 percent of the height of the mixture to form the trough 35 with the required thickened marginal edges 37 and 38 as shown in FIG. 6.

A wide range of resilient organic foam materials can be reclaimed and bound into sheet form in accordance with the present invention. Preferably polyurethane foam materials having densities in the range of from 1 lb/cu.ft. to 10 lbs/cu.ft. are used. Open or closed cell foams can be used. Other useful foam materials include polyethylene foams, polypropylene foams, synthetic and natural rubber foams, polyvinyl foams and the like.

The binder used is cured to form a resilient polyurethane binder in the completed sheet material. The cured binder preferably has a density in the range of from 40 to 60 lbs/cu.ft. and a durometer hardness of from 35 to 60 with the lower value similar to that of nature gum rubber sheeting. In some cases, the binder itself foams slightly during the curing operation although it is preferred that foam formation be avoided in order to increase the adhesive properties of the binder.

The binder incorporated into the foam particles in the mixture is in the form of a prepolymer comprising a mixture of a polyol and an isocyanate. The polyol can be conventional polyethers or polyesters as known in the art. The polyester-diisocyanate prepolymer or intermediate reaction polymer as is known in the art can be prepared from an anhydrous chain extender polyester made from a glycol, for example, a mixture of ethylene and propylene glycols, and an aliphatic saturated dicarboxylic acid, for example, adipic acid, using an excess of glycol over the acid so that the resulting polyester contains terminal alcoholic hydroxyl groups. Such polyester may be linear, or it may be branched, the latter effect being achieved by including in the preparation a trialcohol, such as trimethylolpropane or trimethylolmethane. Usually such an amount of glycol is used as to give a polyester having a hydroxyl number of 20 to 120, and preferably 36 to 67, and a low acid value less than 2 and preferably less than 1. The molecular weight of the polyester preferably ranges from 1700 to 3000. The polyester employed may also be a polyester amide. Polyethers, especially polyether glycols having terminal alcoholic hydroxyl groups, may also be used in place of polyesters. The polyester or the like is reacted with a polyisocyanate, for example, triphenylmethane triisocyanate, naphthalene 1,5-diisocyanate, or p,p'-diphenylmethane diisocyanate, using a considerable molar excess, commonly from a 10 percent to a 250 percent and preferably from a 10 percent to 50 percent molar excess, of the polyisocyanate over that amount which would be required to react with all of the alcoholic hydroxyl groups furnished by the polyester. The reaction is frequently affected by heating a mixture of the polyester, or similar high molecular weight compound having two or more alcoholic hydroxyl groups, and the polyisocyanate under anhydrous conditions at an elevated temperature, e.g. 70°–150° C., to form a soluble, uncured, material which is a polyurethane having terminal isocyanate groups.

The polyisocyanates employed in preparing the polyester-polyisocyanate intermediate are generally diisocyanates, for example, polymethylene diisocyanates such as ethylene diisocyanate, hexamethylene diisocyanate and tetramethylene diisocyanate; alkylene diisocyanates such as propylene-1,2-diisocyanate; cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthylene diisocyanate, in which category we include aliphatic-aromatic diisocyanates such as p,p'-diphenylmethane diisocyanate and phenylethane diisocyanate

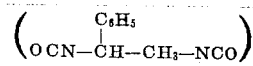

Triisocyanates are also suitable, such as those having isocyanate groups attached to a trivalent hydrocarbon radical, whether an aliphatic, aromatic, or aliphatic-aromatic radial as in butane-1,2,2,-triisocyanate, benzene-1,3,5-triisocyanate, diphenyl-2,4,4'-triisocyanate, diphenyl-4,6,4'-triisocyanate, toluene-2,4,6-triisocyanate, ethyl benzene-2,4,6-triisocyanate and triphenyl-methane-4,4',4''-triisocyanate. Triisocyanates derived from corresponding substituted trivalent hydrocarbon radicals, such as monochlorobenzene-2,4,6-triisocyanate may also be used.

Many such polyester-polyisocyanate intermediate products, herein referred to as the uncured polyurethane or polyurethane prepolymers, can be thus prepared in the form of liquids utilizable directly for admixture with the shredded foam scrap, but if they are solids or unduly viscous liquids they are first dissolved in a suitable volatile organic solvent such as carbon tetrachloride, methyl isobutyl ketone, benzene, methyl ethyl ketone, ethyl acetate, low viscosity mineral oil, seal oil, kerosene, etc., to facilitate application.

Polyether diisocyanate intermediate reaction products or prepolymers which are admixed with the shredded or cut polyurethane foam or other foam are known and are typically prepared from an anhydrous chain extending polyether glycol such as polymerized-1,2-ethylene glycol, propylene glycol or 2,3-butane diol. The polyethers may be linear or branched and preferably range in molecular weight from 100 to 7000 with a preferred range of from 1000 to 4500 molecular weight having OH numbers in the range of from 40 to 150 with acid numbers preferably less than 1. The isocyanates used with the polyethers and/or polyesters are preferably mixed with the isocyanates with a molar excess of 8 to 10 percent isocyanate.

The intermediate reaction products or prepolymers used as binders can be formed by continuously mixing the isocyanate with the hydroxyl rich compound such as a mixture of a polyol and toluene diisocyanate for periods of approximately 2 hours after which diluents are added over 1 to 2 hour periods and the batch blended for approximately 6 hours prior to use in the mixer 13. The amount of binder used will vary depending upon the type of foam and the processing conditions in the system which include time and temperatures used.

Preferably the binder is used in amounts of from 2 to 15 percent by weight of the foam particles. The rate of belt travel can be adjusted from 5 to 40 feet per minute again depending upon the particular materials used with a preferred travel rate of belts 20 and 21 being in the range of from 16 to 32 feet per minute. Time of the mixture in the reaction zone is preferably in the range of from about 0.9 minutes to 7 minutes. The temperature in the reaction zone is preferably maintained in the range of from 200°F to 240°F with an optimum range lying at about 210° to 215°F. The temperatures can be elevated but may tend to melt the surfacing sheets used while lower temperatures extend the cure time beyond a satisfactory time. The amount of compression in the reaction zone 24 can vary greatly but is preferably sufficient to compress the binder-foam mixture to from about 50 percent to 15 percent of its original thickness X.

The binder preferably has common catalysts incorporated in it prior to admixture with the foam in the mixers 13 and 13'. Such catalysts include water, amines and metal compounds including stannous octoate, di-n-butyldiacetoxystannane, dibutylene di-2ethylhexoate, stannous 2-etylhexoate-tin octoate, N,N dimethyl cyclohexyl amine, triethylene diamine, triethylene diamine (33.3 percent soln. by weight) in dipropylene glycol, N,N,N,'N'-tetramethyl-1,3-butanediamine, 70 percent -bis(2-dimethyl aminoethyl) ether-30 percent dipropylene glycol and N-ethyl morpholine.

It is preferred to add water to the scrap particles both before mixture with the binder as well as when the mixture is on the belt 20 to insure reaction of the binder to its cured state in the reaction zone.

It is a feature of this invention that flame retardant agents can be added to the binder prior to curing and preferably mixed with the binder before it is mixed with the foam in mixers 13 and 13'. Such flame retardant agents include known agents including phosphorous, chlorine and bromine organic materials such as tris (2,3-dibromo propyl) phosphate, tris (di-chloropropyl) phosphate, antimony trioxide,tris B-chloroethyl phosphate, and tris (1,3-dichloroisopropyl) phosphate. Preferably the flame retardant agents are used in amounts of from 30 percent to 60 percent by weight of the binder. As is known, such flame retardant agents slow or eliminate burning at the surface of urethane polymers and they can be used in the binder preparation in conventional amounts. It is a feature of this invention that since the binder is uniformly admixed with the foam particles and coats all exposed surfaces, the resulting foam sheet material has a flame retardant coating produced in a single run through the machine. This feature is impossible to obtain if the sheet is peeled from a roll stock as is conventionally done in industry now.

The surfacing sheets 33 are preferably polyethylene sheets having a thickness of from 0.001 to 0.005 inch. Other yieldable solid plastic sheets such as polypropylene, polystyrene and the like can be used. It is preferred that the surfacing sheets have sufficient water permeability to permit passage of steam from tanks 25 and 26 to the mixture in the reaction zone. In order to enhance passage of the steam to the binder-foam mixture when surfacing sheets are used, the sheets can be perforated with pinholes at suitable intervals on the sheets prior to passage into the reaction zone as by transverse and longitudinal rows of pinholes one-fourth inch apart.

In one specific example of this invention, the reaction zone 24 is heated to a temperature of about 220°F with belts 20 and 21 each having a width of 60 inches and a parallel length in the reaction zone of 35 feet. The belts are uniformly moved at a rate of 20 feet per minute. The parallel portions of the belts 20 and 21 as seen in FIG. 1 are uniformly spaced apart a distance of 1 inch. A steam generation of 25 horsepower is used to maintain steam generation in the reaction zone.

A mixture of elastomeric scrap polyurethane foam having a density of about 2 lbs/cu.ft. is continuously reduced at a rate of 22 pounds per minute in grinder 11 to a particle size of about 1 inch squares and then passed continuously to the grinder 12 where the particle size is further reduced to approximately ⅜ inch squares. The shredded foam so produced is continuously passed to the mixer 13' which is a Kelly duplex mixer and then to mixer 13. As the foam is mixed within the mixers, resin prepolymer from suitable spray heads located in the mixers is continuously sprayed onto the foam in each mixer and uniformly admixed therewith in an amount of 1.2 lbs/per minute in each mixer to give a resin to foam ratio of 1 to 10. The metering device 14 is operated at a speed of 24 rpm to continuously deposit the resin binder mixture on the leading end of the belt 20 with the mixture having a width of 58 inches and a height of approximately 3 inches. Approximately 24 pounds per minute of the resin-binder mixture are deposited on the belt 20.

The resin prepolymer which is sprayed into the mixture is prepared by mixing a polyether (Olin Mathieson Chemical Corp. polyether resin 30–30) a 3000 molecular weight propylene oxide adduct of glycerine having the following properties: specific gravity at 25°/25°C. 1.003, volatility, wt.% 0.08, hydroxyl number, mg. KOH/gm. 56, acid number, mg. KOH/gm. pH in 10:6 isopropanol-water solvent at 25°C. 5.6, total unsaturation, meq./gm. 0.022, viscosity at 25°C., cps 510, in an amount of 100 parts with 40 parts of 80/20 toluene diisocyanate, 25 parts mineral seal oil, 10 parts of kerosene and 0.1 parts of stannous octolate with all parts being given by weight of the entire mixture. The prepolymer is formed by blending and mixing the polyether and isocyanate for 2 hours at 150°F, adding the other ingredients at a continuous rate for 1 hour, batch blending at 150°F for 6 hours and then spraying directly into the mixers 13' and 13.

As the binder-foam mixture passes the rotating butterfly spreading device 18, the foam mixture is formed into the cross sectional configuration shown in FIG. 6 wherein the base width is 58 inches, the height X is 2¾ inches and the width of the level portion of the trough is 54 inches. Leveling indicator 20 is set to indicate an alarm bell if the level exceeds 2¾ inches. Similarly, the safety device 19 is set to indicate an alarm if a foreign object in the foam exceeds three-fourths inch in thickness.

A fully cured, bound, reclaimed, mechanically strong, resilient foam sheet is produced during passage through the reaction zone 24 and wound on a suitable takeup reel. The resultant foam sheet has a thickness of 1 foot and a width of 57 inches prior to edge trimming with substantially uniform thickness throughout the sheet. The density of the resultant foam sheet is approximately 4½lbs/cu.ft.

In still another example of this invention, the procedure of example 1 is repeated; however, top and bottom surfacing sheets 33 of 1 mil thick, 57 inches wide polyethylene are used and continuously fed through the reaction zone. Spray heads 51 spray water on the sheets 33 at a rate of one-sixteenth gallons per minute. The resultant laminated sheet has adhesively secured top and bottom surface sheets 33. In this embodiment, the side edges of the sheet formed are trimmed to obtain planar side edges. A tensioning roll 30 is used and the sheet is split in half across its width by a conventional slitter 28 after which the two sheets thus formed are wound on the takeup rolls 30 and 31.

In still another embodiment of this invention, example 1 is duplicated with the addition of 40 parts by weight flame retardant agent to the resin prepolymer. The resultant sheet produced is found to have an integral polyurethane surfacing layer and is highly flame retardant.

In still another embodiment of the invention, example 1 is repeated and in addition one-tenth gallons per minute of water are sprayed into mixer 13' and uniformly mixed with the binder-foam mixture. The resultant sheet produced is basically similar in properties to the sheet of example 1.

When the above-noted examples are duplicated with variations in prepolymers and reaction zone conditions, advantageous products are obtained.

I claim:

1. An apparatus for continuously forming resilient foam sheet material from resilient organic foam particles, said apparatus comprising means for forming particles of resilient organic foam, means for receiving said foam particles and admixing said foam particles with a polyurethane resin binder therefor, metering means for metering said mixture from said receiving and admixing means to a moving conveyor, conveyor means positioned below said metering means for receiving said binder-foam particle mixture and carrying said mixture to a reaction zone, means positioned between said metering means and said reaction zone for continuously leveling and spreading said mixture on said conveyor, means for monitoring the height of said mixture on said conveyor whereby said metering can be controlled, and means for heating, compressing and curing said mixture to form a uniform density bound foam sheet in said reaction zone.

2. An apparatus in accordance with claim 1 and further comprising means positioned between said leveling and spreading device and said reaction zone for detecting foreign objects in said mixture.

3. An apparatus in accordance with claim 1 wherein said leveling and spreading means comprises a means for forming a trough in a top surface of said mixture.

4. An apparatus in accordance with claim 1 wherein said means for receiving said foam particles and admixing said foam particles with the polyurethane resin binder comprise a first and second mixer arranged in series, and said metering means comprising an elongated shaft mounted for rotation in an open bottom trough, said elongated shaft carrying a plurality of blades so that the speed of rotation of said shaft determines the rate of flow of the particles and admixed binder from said admixing means.

5. An apparatus in accordance with claim 2 wherein said means for detecting foreign objects comprises a spring-loaded roller positioned adjacent a moving conveyor belt to sense pressure applied to said belt.

6. An apparatus in accordance with claim 3 wherein said leveling and spreading means comprise a rotatable axle carrying a plurality of axially extending blades having inturned edge portions.

7. An apparatus in accordance with the apparatus of claim 1 wherein said metering means comprises an elongated shaft mounted for rotation in an open bottom trough, said elongated shaft carrying a plurality of blades so that speed of rotation of said shaft determines the rate of flow of the particles and admixed binder from said admixing means.

8. An apparatus in accordance with claim 7 wherein said monitoring means is interconnected with said metering means to change the speed of rotation of said shaft.

* * * * *